United States Patent
Maguire (10) Patent No.: US 11,284,374 B2
(45) Date of Patent: Mar. 22, 2022

(54) METHOD AND APPARATUS FOR MANAGING WIRELESS COMMUNICATIONS NETWORK

(71) Applicant: Telefonaktiebolaget LM Ericsson (publ), Stockholm (SE)

(72) Inventor: Patrick Maguire, Athlone Westmeath (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 38 days.

(21) Appl. No.: 16/621,783

(22) PCT Filed: Jun. 15, 2017

(86) PCT No.: PCT/EP2017/064699
§ 371 (c)(1),
(2) Date: Dec. 12, 2019

(87) PCT Pub. No.: WO2018/228698
PCT Pub. Date: Dec. 20, 2018

(65) Prior Publication Data
US 2020/0154401 A1    May 14, 2020

(51) Int. Cl.
*H04W 72/04* (2009.01)
*H04L 12/24* (2006.01)
(Continued)

(52) U.S. Cl.
CPC ........... *H04W 72/04* (2013.01); *H04L 41/044* (2013.01); *H04L 41/145* (2013.01)

(58) Field of Classification Search
None
See application file for complete search history.

(56) References Cited

U.S. PATENT DOCUMENTS 10,200,234 B2 * 2/2019 Tang .................... H04L 41/04
10,595,190 B2 * 3/2020 Chou ..................... H04W 8/12
(Continued)

FOREIGN PATENT DOCUMENTS

EP      2 446 584        12/2010
WO      2010 149211 A1   12/2010

OTHER PUBLICATIONS

3GPP TS 32.622 V4.4.0 Technical Specification, 3rd Generation Partnership Project; Technical Specificaiton Group Services and System Aspects; Telecommunicaiton management; Configuraiton Management (CM); Generic network resources Integration Reference Point (IRP): Network Resource Model (NRM) (Release 4), Jun. 2003.*

(Continued)

*Primary Examiner* — Kenny S Lin
(74) *Attorney, Agent, or Firm* — Baker Botts, LLP (57) ABSTRACT

A method in a domain manager for managing a wireless communications network operating at least one network slice. A network slice comprises a logically grouped subset of network resources and/or network functions. The method comprises populating (202) a first Information Object Class instance representing the network slice, adding (204) the populated first Information Object Class instance to a generic Network Resource Model and exposing (206) the modified generic Network Resource Model.

10 Claims, 10 Drawing Sheets

(51) Int. Cl.
*H04L 41/044* (2022.01)
*H04L 41/14* (2022.01)

(56) References Cited

U.S. PATENT DOCUMENTS

| | | | | |
|---|---|---|---|---|
| 2007/0276936 | A1* | 11/2007 | Hirsch | H04L 41/06 709/223 |
| 2013/0039196 | A1* | 2/2013 | Bodog | H04L 41/00 370/252 |
| 2013/0339508 | A1* | 12/2013 | Tse | H04L 41/0233 709/223 |
| 2015/0127798 | A1* | 5/2015 | Tovinger | G06F 8/71 709/223 |
| 2015/0156773 | A1* | 6/2015 | Yao | H04W 36/0072 370/252 |
| 2015/0271025 | A1* | 9/2015 | Yao | H04L 67/12 370/241.1 |
| 2018/0317134 | A1* | 11/2018 | Leroux | H04W 24/02 |
| 2019/0021010 | A1* | 1/2019 | Senarath | H04L 41/044 |
| 2019/0158364 | A1* | 5/2019 | Zhang | H04L 41/5054 |

OTHER PUBLICATIONS

3GPP TR 28.801 v1.2.0; Technical Report; 3rd Generation Partnership Project; Technical Specification Group Services and System Aspects; Telecommunication management; Study on management and orchestration of network slicing for next generation network (Release 15)—May 2017.
3GPP TR 28.801 v1.0.0; Technical Report; 3rd Generation Partnership Project; Technical Specification Group Services and System Aspects; Telecommunication management; Study on management and orchestration of network slicing for next generation network (Release 14)—Mar. 2017.
3GPP TS 28.622 v13.1.0; Technical Specification; 3rd Generation Partnership Project; Technical Specification Group Services and System Aspects; Telecommunication management; Generic Network Resource Model (NRM) Integration Reference Point (IRP); Information Service (IS) (Release 13)—Dec. 2016.
3GPP TS 28.623 v13.2.0; Technical Specification; 3rd Generation Partnership Project; Technical Specification Group Services and System Aspects; Telecommunication management; Generic Network Resource Model (NRM) Integration Reference Point (IRP); Solution Set (SS) definitions (Release 13)—Jun. 2016.
3GPP TS 32.103 v14.0.0; Technical Specification; 3rd Generation Partnership Project; Technical Specification Group Services and System Aspects; Telecommunication management; Integration Reference Point (IRP) overview and usage guide (Release 14)—Dec. 2016.
3GPP TSG SA WG5 (Telecom Management) Meeting #111Bis; Munich (Germany); Source: Huawei; Title: Add potential methods for network slice composition (S5A-170117, revision of S5-17xabc)—Feb. 13-17, 2017.
PCT Notification of Transmittal of the International Search Report and the Written Opinion of the International Searching Authority, or the Declaration for International application No. PCT/EP2017/064699—Feb. 13, 2018.
NGMN, A Deliverable by the NGMN Alliance, NGMN 5G White Paper; Version: 1.0; Project: NGMN 5G Initiative; Editor/Submitter: Rachid El Hattachi/Javan Erfanian—Feb. 17, 2015.

* cited by examiner

METHOD AND APPARATUS FOR MANAGING WIRELESS COMMUNICATIONS NETWORK

PRIORITY

This nonprovisional application is a U.S. National Stage Filing under 35 U.S.C. § 371 of International Patent Application Serial No. PCT/EP2017/064699 filed Jun. 15, 2017 and entitled "METHOD AND APPARATUS FOR MANAGING WIRELESS COMMUNICATIONS NETWORK" which is hereby incorporated by reference in its entirety.

TECHNICAL FIELD

The present invention relates to method and apparatus for managing a wireless communications network operating a network slice, in general, and in particular to extending Itf-N Integration Reference Point to support wireless communications network operating a network slice.

BACKGROUND

As the communications networks evolve the number of services provided grows. From a simple voice communication at the very beginning to voice and data communication, including texting, email, web browsing, video transmission and others in 4G wireless networks. When looking at the wide range of applications and services to be provided by a 5G network, it is quite obvious that these cannot effectively be addressed with a traditional approach of having a purpose-built network for each application. This would lead to high cost for networks and devices as well as inefficient use of valuable frequency resources. An operator may have one physical network infrastructure and one pool of frequency bands, which may support many separate virtualized networks, also called network slices. Each network slice may have unique characteristics for meeting the specific requirements of the use case/s it serves.

A key function of 5G Core network is to allow for flexibility in network service creation, making use of different network functions suitable for the offered service in a specific network slice, e.g. Evolved Mobile Broadband (MBB), Massive Machine Type Communication (MTC), Critical MTC, Enterprise, etc.

Network slicing is about creating logically separated partitions of the network, addressing different business purposes. These network slices are logically separated to a degree that they can be regarded and managed as networks of their own. Network slices can be associated with different slice tenants, namely entities that provide services to the end user via the network slice. Examples of slice tenants could be:

- armed forces providing, for example, voice communication via a dedicated network slice;
- vehicles manufacturers providing, for example, vehicle diagnostic services via a dedicated network slice.

It is also common to associate a Service Level Agreement (SLA) to each network slice. An SLA indicates the treatment to which services provided within the network slice should be subjected.

Network slicing is a new concept that applies to both LTE Evolution and new 5G RAT. The key driver for introducing network slicing is business expansion, i.e. improving the cellular operator's ability to serve other industries, e.g., by offering connectivity services with different network characteristics (performance, security, robustness, and complexity).

Figure 1:
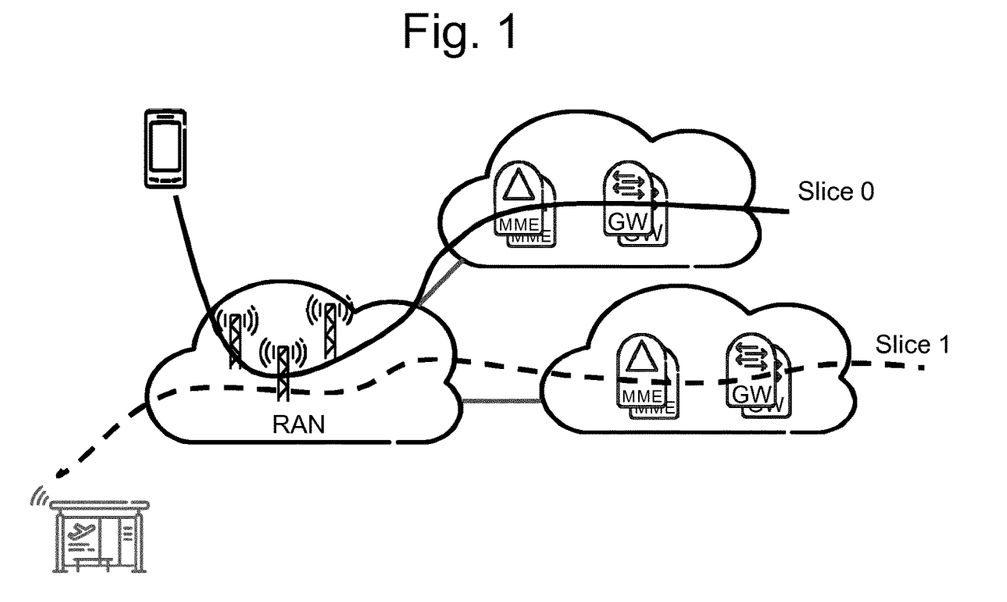
FIG. 1 is a diagram illustrating an architecture of a wireless communications network operating two network slices.

The current working assumption is that there will be one shared Radio Access Network (RAN) infrastructure that will connect to several Core Network (CN) instances, such as Evolved Packet Core (EPC) instances (one EPC instance per network slice) or a further EPC evolution. Although it is assumed that there will be a one to one mapping between slice and CN Instance, where an instance is a CN node, concepts, features, aspects may be equally applicable to multiple slices supported by the same CN instance. As the CN functions (e.g. EPC functions) are being virtualized, it is assumed that the operator may instantiate a new Core Network when a new slice should be supported. In another case the network slices could be implemented based on existing monolithic EPC architecture based on special purpose hardware. This architecture is shown in FIG. 1 where Slice 0 can for example be a Mobile Broadband slice and Slice 1 can for example be a Machine Type Communication network slice.

When it comes to one physical RAN used for multiple network slices, two aspects should be taken into account. The first aspect is that network slicing should make possible to support several different virtual networks on the same physical network infrastructure in order to reduce costs and energy consumption compared to deploying separate physical networks for the different use cases or business scenarios. In order to fully exploit this benefit, it is required that the slicing concept allows for efficient usage of common resources such as radio resources and infrastructure, and transport links between the slices such as fronthaul and backhaul. The second aspect is that mechanisms are required to protect common channels or resources used for UEs (user equipment) accessing system so that congestion in one slice does not have a negative impact on another slice (often called slice isolation).

With the adoption of network slicing, it will be possible that two (or more) different slices contain all the services, which exist today, but there will still be the need to differentiate access as two (or more) slices represent different SLAs. In fact, scenarios may be foreseen where the same type of service is provided by different slices associated with SLAs with different slice tenants. This would lead to more slices and to a further need for slice awareness information at the RAN.

Today, operator's Network Management System (NMS) see subnetworks consisting of a management node (domain manager or subnetwork manager depending on naming convention) and the nodes (managed elements) it manages. The interface between NMS and underlying domain management systems is called Interface-N (Itf-N).

A network can be configured in which configuration management employs a network resource model (NRM). In this approach, the model uses objects to represent the actual managed communications network resources, for example specific network elements. A Network Resource Model describes managed object classes, their associations, attributes, and operations. A Managed Object (MO) is a software object that encapsulates management characteristics and behaviour of a particular network resource. The managed object is an "instance" of a "managed object class" defined in an NRM. A managed object class has attributes that provide information used to characterise the objects that belong to the class. In addition, a managed object class can have operations that represent the behaviour relevant for that class. An instance of a managed object class is sometimes called a "managed element". Information related to the management of a network element is transported by using a network resource model.

For the purpose of management interface development, 3GPP in Technical Specification 32.103 v14.0.0 has developed an interface concept known as Integration Reference Point (IRP) to promote the wider adoption of standardized management interfaces in communications networks. According to the 3GPP TS 32.103 IRP is an architectural concept that is described by a set of specifications for definition of a certain aspect of a management interface. These specifications include Requirements, Information Service, and one or more Solution Set specifications. Information Service describes information related to the entities (either network resources or support objects) to be managed and the way that the information may be managed for a certain functional area. The Network Resource Model mentioned earlier is an Information Service describing instances of Information Object Classes representing the manageable aspects of network resources, for example an RNC or an NodeB. The IRP concept and associated methodology employs model-driven development, protocol and technology neutral modelling methods as well as protocol specific solution sets to achieve its goals. The IRP concept covers a number of technical specifications of three different types: NRM (Network Resource Model) IRPs, Interface IRPs and Data Definition IRPs. 3GPP published a number of IRP specifications each of which is related to a particular Network Resource Model as defined in 3GPP TS 32.103 v.14.0.0. An example of an NRM IRP is the Generic NRM IRP specified in 3GPP TS 28.621 v.14.0.0. The Generic NRM IRP provides generic network resources information that can be communicated between an IRP Agent and one or several IRP Managers for network management purposes.

Throughout this document references to 3GPP documents are made to the most recent release at the time of filing (release 14), but the elements referred to were published in earlier releases too.

Implementations of the NRM IRPs support access (for management purposes) over the Itf-N interface using one or more of the Interface IRPs, where a so-called IRP Agent allows a IRP Manager to manage network information in the form of Managed Objects (MOs; instances of MOCs). Such a managed object (MO) can be seen as a software object that encapsulates the manageable characteristics and behaviour of a particular network entity or network resource. This IRP agent is equivalent to any service providing entity supporting an interface, e.g. a "server" in a "client-server" architecture, and the IRP Manager is equivalent to any service consuming entity using an interface, e.g. a "client" in a "client-server" architecture. These MOs that represent the real network resources in a wireless communications network that can be managed, e.g. a base station or a radio cell, can be created, configured, read and updated throughout their lifetime until they can be ultimately deleted.

SUMMARY

According to a first aspect of the present invention there is provided a method in a domain manager for managing a wireless communications network operating at least one network slice. The network slice comprises a logically grouped subset of network resources and/or network functions. The method comprises populating a first Information Object Class instance representing the logically grouped subset of network resources and/or network functions of said network slice and adding the populated first Information Object Class instance to a generic Network Resource Model to produce a modified generic Network Resource Model. The method further comprises exposing the modified generic Network Resource Model.

According to a second aspect of the present invention there is provided a method in a network manager for managing a wireless communications network operating at least one network slice. The network slice comprises a logically grouped subset of network resources and/or network functions. The method comprises receiving from a domain manager a modified generic Network Resource Model, said modified generic Network Resource Model comprising a first Information Object Class instance representing the logically grouped subset of network resources and/or network functions of said network slice. The method also comprises receiving from the domain manager messages comprising information related to operation of Managed Elements managed by the domain manager. The messages comply with an interface defined by said modified generic Network Resource Model. The method further comprises carrying out a management operation on said at least one network slice.

According to a third aspect of the present invention there is provided a domain manager for managing a wireless communications network operating at least one network slice. The network slice comprising a logically grouped subset of network resources and/or network functions. The domain manager comprises a processor and a memory, the memory containing instructions executable by the processor such that the domain manager is operative to populate a first Information Object Class instance representing the logically grouped subset of network resources and/or network functions of said network slice and add the populated first Information Object Class instance to a generic Network Resource Model to produce a modified generic Network Resource Model. The domain manager is also operative to expose the modified generic Network Resource Model.

According to a fourth aspect of the present invention there is provided a network manager for managing a wireless communications network operating at least one network slice. The network slice comprises a logically grouped subset of network resources and/or network functions. The network manager comprises a processor and a memory, the memory containing instructions executable by the processor such that the network manager is operative to receive from a domain manager a modified generic Network Resource Model. The modified generic Network Resource Model comprises a first Information Object Class instance, said first Information Object Class instance representing the logically grouped subset of network resources and/or network functions of said network slice. The network manager is also operative to receive from the domain manager messages comprising information related to operation of Managed Elements managed by the domain manager. The messages complying with an interface defined by said modified generic Network Resource Model. The network manager is also operative to carry out a management operation on said at least one network slice.

According to a fifth aspect of the present invention there is provided a domain manager for managing a wireless communications network operating at least one network slice. The network slice comprises a logically grouped subset of network resources and/or network functions. The domain manager comprises a module for populating a first Information Object Class instance representing the logically grouped subset of network resources and/or network functions of said network slice and a modifier for adding the populated first Information Object Class instance to a generic Network Resource Model to produce a modified generic Network Resource Model. The domain manager also comprises a publisher for exposing the modified generic Network Resource Model.

According to a sixth aspect of the present invention there is provided a network manager for managing a wireless communications network operating at least one network slice. The network slice comprising a logically grouped subset of network resources and/or network functions. The network manager comprising a first receiver for receiving from a domain manager a modified generic Network Resource Model. The modified generic Network Resource Model comprises a first Information Object Class instance representing the logically grouped subset of network resources and/or network functions of said network slice. The network manager also comprises a second receiver for receiving from the domain manager messages comprising information related to operation of Managed Elements managed by the domain manager. The messages complying with an interface defined by said modified generic Network Resource Model. The network manager further comprises a management module for carrying out a management operation on said at least one network slice.

Further features of the present invention are as claimed in the dependent claims.

BRIEF DESCRIPTION OF THE DRAWINGS

The present invention will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

In order to meet the evolving requirements on network management in a 5G context, there is now a need to be able to deploy and manage logical networks for a particular business purpose. Such logical networks formed of Managed Elements (ME) Group (network slices) create the need to be able to manage the associated group of network elements as a collective entity. Additionally, the manner in which network element will be managed may differ depending on whether they are physical network functions (PNFs) or virtual network functions (VNFs).

Today 3GPP IRPs on Itf-N interface do not support the capability of network function type (physical or virtual) or ME Group (i.e. network slice).

Figure 10:
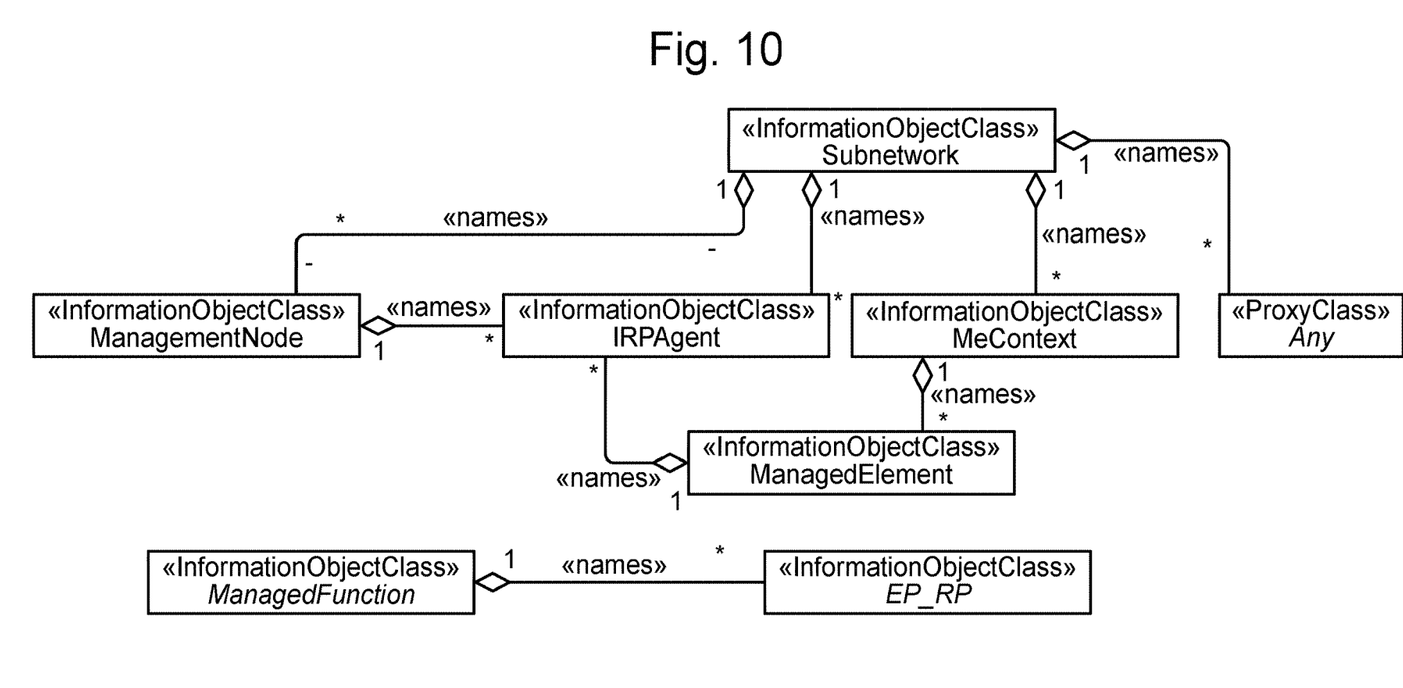
FIG. 10 is a diagram illustrating a generic network resource model known from 3GPP TS 28.622 v14.0.0.

The generic Network Resource Model illustrated in FIG. 10 is the structure known from 3GPP TS 28.622 v14.0.0. The inventor realised that in order to achieve efficient network management in future 5G network deployments the generic Network Resource Model must be modified.

A network slice is composed of a subnetwork instance or multiple subnetwork instances (e.g. Radio Access Network, transport network, packet core, etc.). A subnetwork instance (SNI) is managed by a Domain Manager whereas a network slice (which is an end-to-end logical entity) is managed by a Network Manager. It must be noted, however, that management operations performed on a network slice by a Network Manager or management operations performed on a subnetwork instance by a Domain Manager affect operation of the network of which the network slice and the subnetwork instance are parts.

Figure 2:
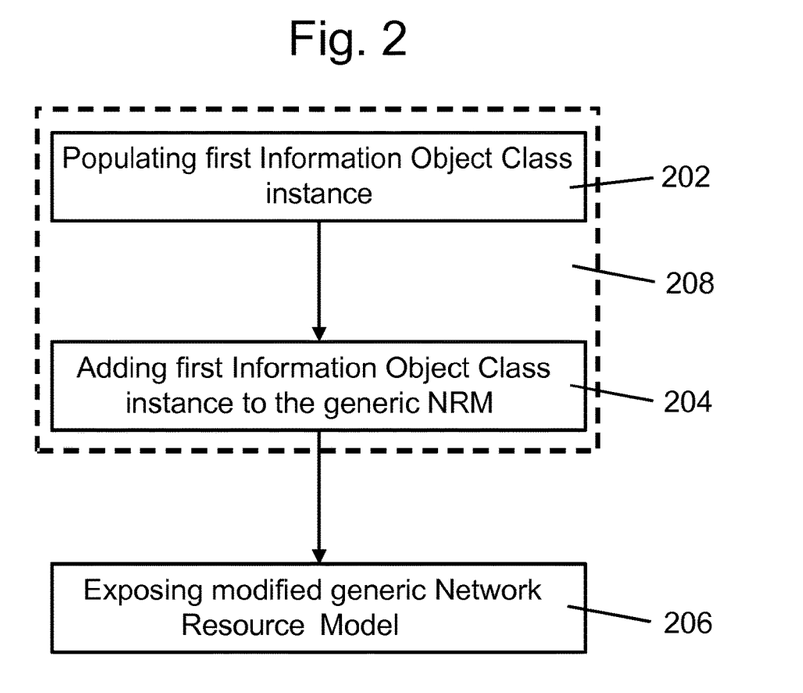
FIG. 2 to FIG. 7 are flowcharts illustrating a method for managing a wireless communications network operating at least one network slice in various embodiments of the present invention.
Figure 11:
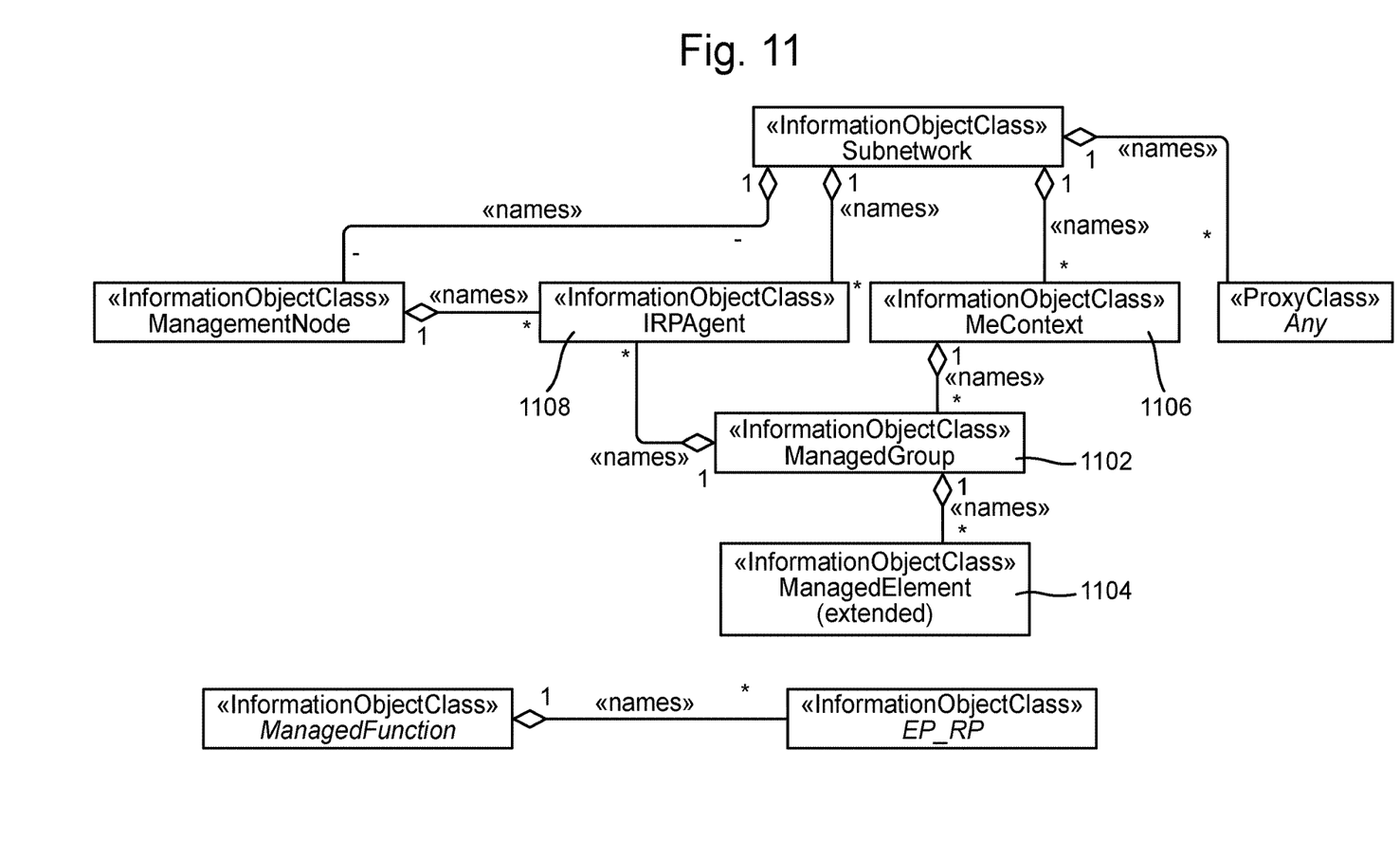
FIG. 11 and FIG. 12 are diagrams illustrating a modified generic network resource model in embodiments of the present invention.

With reference to FIG. 2 an embodiment of a method for managing a wireless communications network operating at least one network slice, is now to be described. The network slice comprises a logically grouped subset of network resources (managed elements, ME). The method in this embodiment is performed in a domain manager (DM). In this embodiment the method comprises populating, 202, a first Information Object Class instance, in a preferred embodiment called ManagedGroup, with information representing the logically grouped subset of network resources and/or network functions of said network slice. For example, a Packet Core Subnetwork Instance would consist of a vMME (virtual Mobility Management Entity), vEPG (virtual Evolved Packet Gateway) and vSAPC (virtual Service-Aware Policy Controller) nodes (or Managed Elements). The method also comprises adding, 204, the populated first Information Object Class instance to a generic Network Resource Model to produce a modified generic Network Resource Model. The generic Network Resource Model describes instances of Information Object Classes representing managed network resources and/or managed network functions. The modified generic NRM in one embodiment is illustrated in FIG. 11. In this embodiment, the ManagedGroup IOC, 1102, is associated with (or connected to) the IRP Agent IOC, 1108, MeContext IOC, 1106, and ManagedElement IOC, 1104. Compared to the generic NRM from FIG. 10, the ManagedElement IOC, 1104 is now associated with only the newly introduced ManagedGroup IOC, 1102. Finally, the modified generic Network Resource Model is exposed, 206.

The term modified generic Network Resource Model used throughout this document refers to a generic Network Resource Model comprising an instance of Information Object Class instance representing the logically grouped subset of network resources and/or network functions, which is denoted in this document as ManagedGroup IOC.

Populating the first Information Object Class instance and adding said instance to the generic Network Resource Model in one embodiment may be carried out as a single operation, 208, which results in a modified generic NRM comprising a populated first Information Object Class. In this embodiment, the populating is performed directly in the data structure of the generic Network Resource Model. In an alternative embodiment, the operation of populating creates a data structure of the first Information Object Class instance outside of the generic NRM and the first Information Object Class instance is then added to the generic NRM.

The other instances of Information Object Classes illustrated in FIG. 11 are also populated with relevant data as it is known from earlier solutions based on the generic NRM.

FIG. 11 illustrates one possible implementation in which the ManagedGroup IOC, 1102, is added in a specific place of the generic NRM. It must be noted, however, that adding the ManagedGroup IOC, 1102, in some other location in the generic NRM would also be possible.

Figure 12:
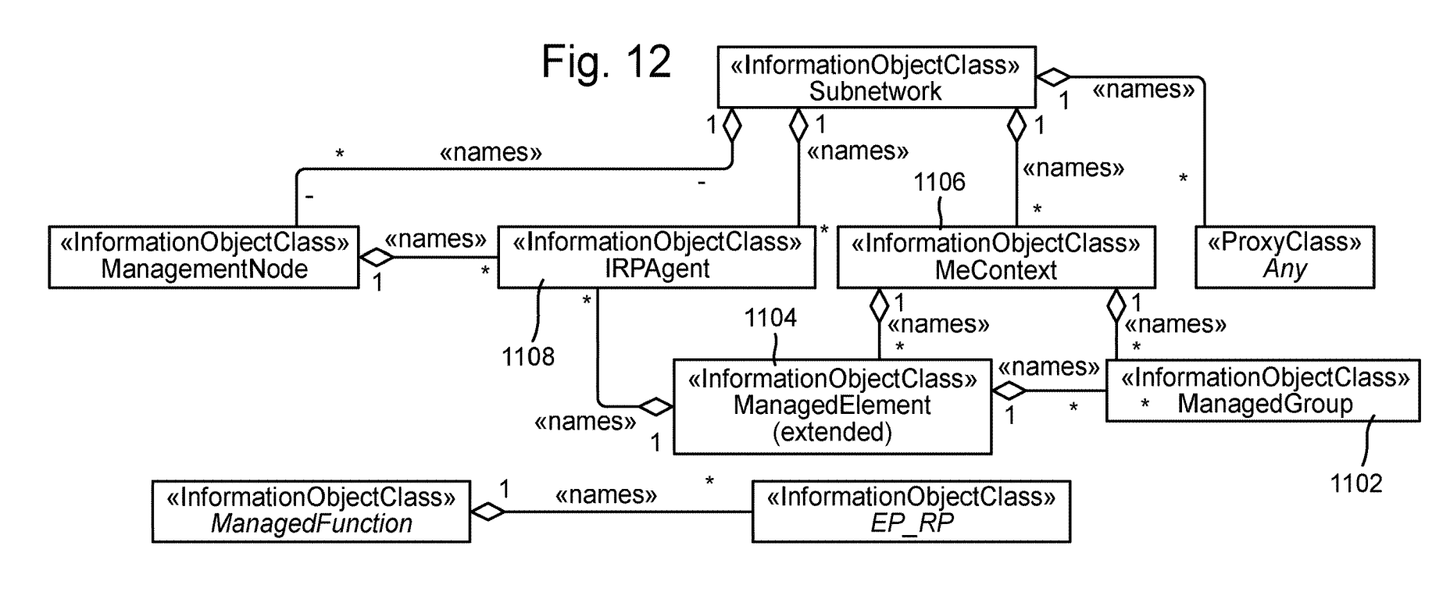

In one alternative embodiment the ManagedGroup IOC, 1102, may be added to the generic NRM at the same level as the ManagedElement IOC, 1104, and the ManagedGroup IOC, 1102, may be associated with MeContext IOC, 1106, and with the ManagedElement IOC, 1104. This embodiment is illustrated in FIG. 12. In this embodiment it is advantageous that an instance of the ManagedGroup IOC, 1102, can be created at any time, can contain any number of associations to instances of ManagedElement IOC, 1104. The ManagedGroup IOC, 1102, instance may be deleted at any time, as long as there is no association with instances of ManagedElement IOC, 1104, remaining. An instance of the ManagedElement IOC, 1104, can be created without any connection (association) to a ManagedGroup IOC, 1102, instance or it may be associated with (included in) a ManagedGroup IOC, 1102, instance. An instance of the ManagedElement IOC, 1104, can also be moved to another instance of ManagedGroup IOC, 1102, deleted from an instance of ManagedGroup IOC, 1102, or deleted altogether once there is no association to an instance of ManagedGroup IOC, 1102.

Figure 3:
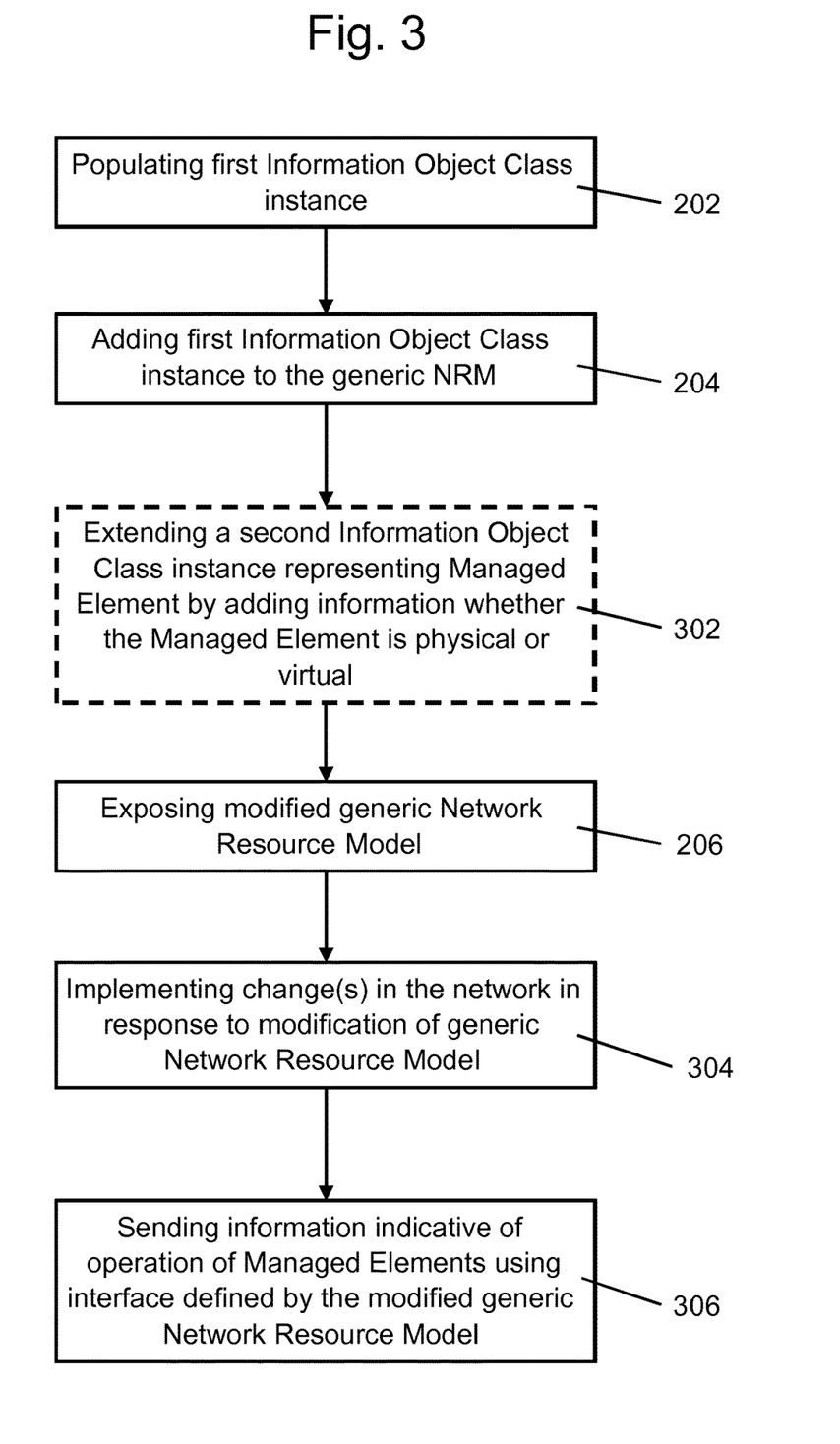

In a preferred embodiment, before the operation of exposing, 206, the method also comprises extending, 302, a second Information Object Class instance of the generic Network Resource Model, the second Information Object Class instance representing a Managed Element, 1104, by adding information identifying whether said Managed Element is a physical network function or a virtual network function. The method in this embodiment is illustrated in FIG. 3. The modified generic NRM including the extended instance of ManagedElement IOC, 1104, is illustrated in FIG. 11 and in FIG. 12. Extending the second Information Object Class instance as described above is optional, but provides a clear advantage for the network manager now being able to identify character of the managed element in question (physical or virtual) and carry out appropriate management operations. This is illustrated explained in more detail in description of FIG. 7.

Extending the ManagedElement IOC, 1104, is an optional feature of the modified generic NRM. This is why the word "extended" has been added in brackets in FIG. 11 and FIG. 12. In its basic embodiment, the method only populates and adds the ManagedGroup IOC instance, 1102, and the word "extended" in 1104 can be ignored.

Preferably, in the step of exposing, 206, the modified generic Network Resource Model is made available by the domain manager via an Itf-N interface to a network manager for use in carrying out a management operation on said at least one network slice.

Figure 13:
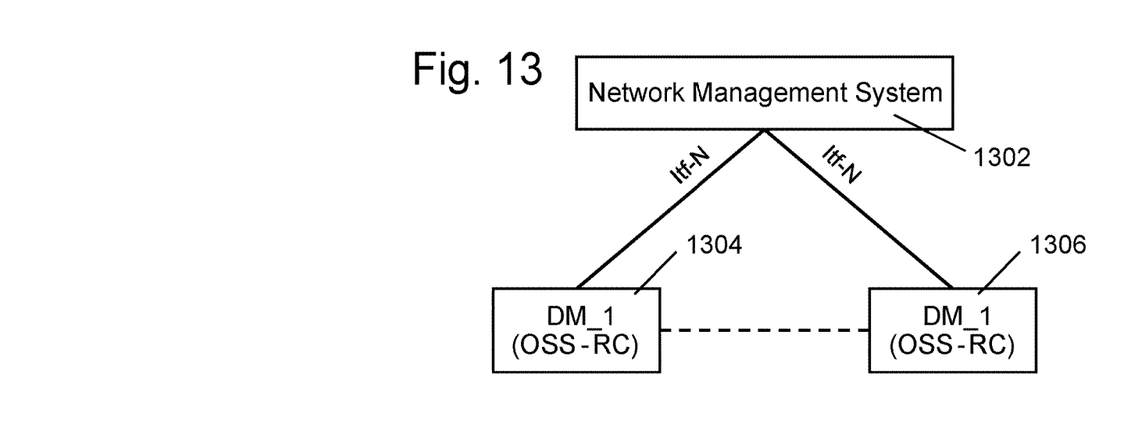
FIG. 13 is a diagram illustrating relation between a network manager and domain managers.

In operation, at this stage (i.e. after the operation of exposing, 206, of the modified generic NRM), the domain manager, 1304, sends, 306, to the network manager, 1302, messages comprising information related to operation (or operations) of Managed Elements managed by the domain manager, 1304, using an interface defined by said modified generic Network Resource Model.

Figure 4:
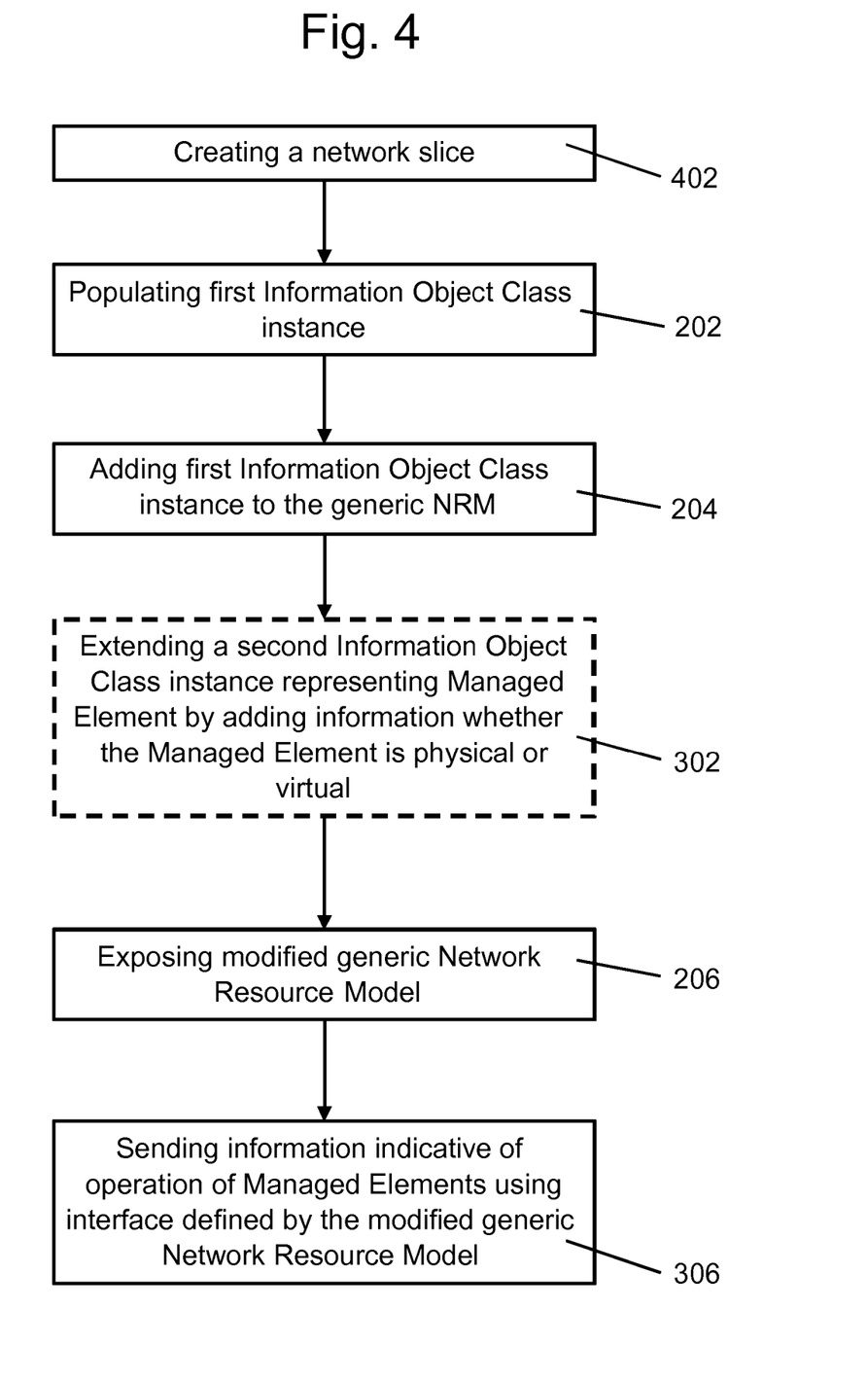

The method implemented in a domain manager can be initiated by populating, 202, the first Information Object Class instance, i.e. the ManagedGroup IOC, 1102, and then after performing the steps of adding, 204, and exposing, 206, the method in this embodiment comprises the step of implementing, 304, a change (or changes) in the network in response to the modifications made to the generic Network Resource Model as illustrated in FIG. 3. In an alternative embodiment, illustrated in FIG. 4, the operation of populating the ManagedGroup IOC, 1102, instance is triggered by a change in the network resulting in instantiation (creation), 402, of said at least one network slice.

After the operation of adding, 204, the modified generic NRM is exposed, 206. Once the modified generic NRM is exposed, 206, via the Itf-N interface it is available to the network manager (e.g. a Network Management System, 1302, depicted in FIG. 13) and ready to use. In operation, at this stage, the domain manager, 1304, sends, 306, to the network manager, 1302, messages comprising information related to operation (or operations) of Managed Elements managed by the domain manager, 1304, using an interface defined by said modified generic Network Resource Model.

In a preferred embodiment, before the operation of exposing, 206, the method also comprises an operation of extending, 302, a second Information Object Class instance of the generic Network Resource Model, the second Information Object Class instance representing a Managed Element, 1104. The second Information Object Class instance is extended by adding information identifying whether said Managed Element is a physical network function or a virtual network function. The modified generic NRM including the extended instance of ManagedElement IOC, 1104, is illustrated in FIG. 11 and in FIG. 12. Extending the second Information Object Class instance is optional, but provides a clear advantage for the network manager now being able to identify character of the managed element in question (physical or virtual) and carry out appropriate management operations. This is illustrated explained in more detail in description of FIG. 7.

Figure 5:
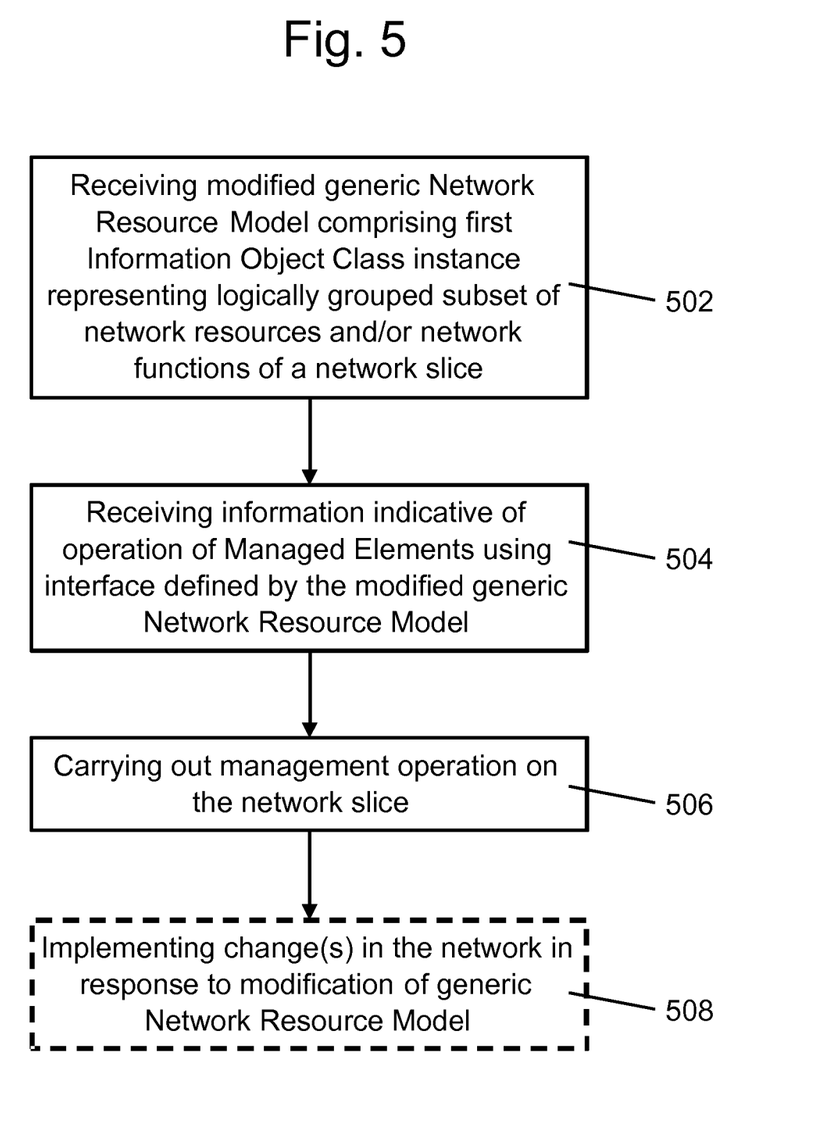

FIG. 5 illustrates an embodiment of the invention as from a network manager's perspective.

In a preferred embodiment, a method for managing a wireless communications network operating at least one network slice performed in a network manager, 1302, comprises receiving, 502, from a domain manager, 1304, a modified generic Network Resource Model. The modified generic NRM describes instances Information Object Classes representing managed network resources and/or managed network functions including a first Information Object Class instance representing a logically grouped subset of network resources and/or network functions of said network slice. In a preferred embodiment, the first Information Object Class instance is called ManagedGroup, 1102, and its location in the structure of the modified generic NRM is illustrated in FIG. 11 and was described earlier.

In the following step the network manager 1302, receives, 504, from the domain manager, 1304, messages comprising information related to operation of Managed Elements managed by the domain manager. Said messages comply with an interface defined by said modified generic Network Resource Model. Because the messages received from the domain manager comply with the interface defined by said modified generic NRM the network manager, 1302, distinguishes individual Manage Elements from a managed group of elements (i.e. a network slice) and then may carry out, 506, a management operation on said at least one network slice.

Preferably, the received modified generic Network Resource Model comprises a second Information Object Class instance representing a Managed Element, ManagedElement IOC 1104, comprising information identifying whether said Managed Element is a physical network function or a virtual network function.

Preferably, the modified generic Network Resource Model is received from the domain manager, 1304, via an Itf-N interface.

In a preferred embodiment the method comprises implementing, 508, changes in the wireless communications network in response to the modifications made to the generic Network Resource Model. In one embodiment the change may be instantiation (creation) of a network slice.

Figure 6:
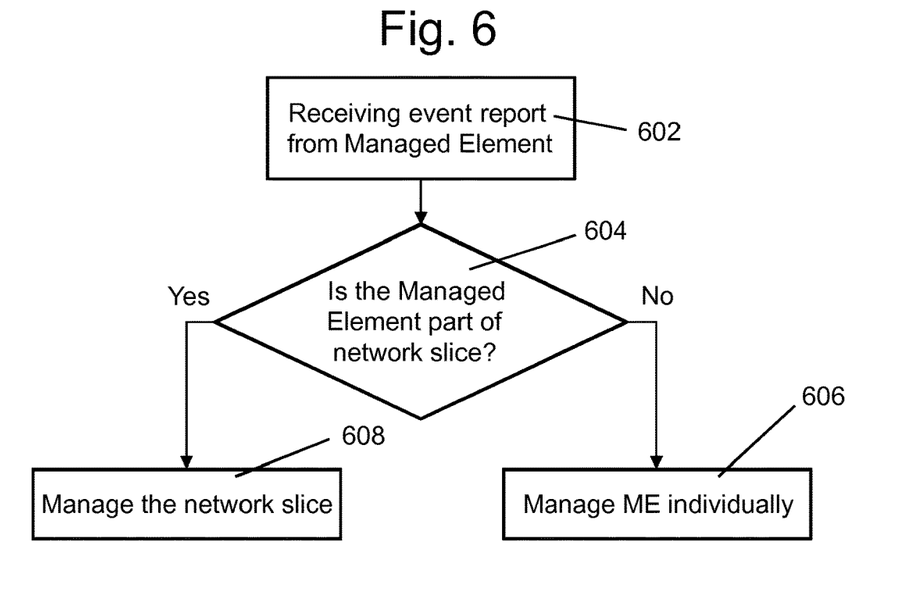

After the network manager, 1302, received the modified generic NRM it is possible to manage the network in a way that takes into account network slice (or network slices) rather than only individual managed elements. In this embodiment, shown in FIG. 6, the network manager receives, 602, an event report from a Managed Element and determines, 604, using the modified generic Network Resource Model, whether the Managed Element is part of a network slice. The operation of determining is relatively simple—because the messages comply with the interface defined by the modified generic NRM the information about a network slice is explicitly identified in the message. The event report from a Managed Element preferably will be sent to the Network Manager via a Domain Manager. In an alternative embodiment the event report may go directly from a Managed Element to the Network Manager. This alternative embodiment is not ad advantageous because the former allows for, so called, "separation of concerns". Finally, the method comprises performing, 606, 608, a management operation in response to the received event report and the result of said determining. If the event report is from an individual Managed Element, 604—No—606, then the management operation is designed for an individual Managed element. If, on the other hand, the event report is from a Managed Element which is part of a network slice, 604—Yes—608, then the management operation considers not only the individual Managed Element, but also the network slice it is part of.

As explained earlier, the modified generic NRM may comprise extended instance of the ManagedElement IOC, 1104. In this embodiment, illustrated in FIG. 7, the method comprises receiving, 702, an event report from a Managed Element and determining, 704, using the modified generic Network Resource Model, whether the Managed Element is a physical network function or a virtual network function. To determine whether the Managed Element is a physical or virtual network function the Network Manager consults the event report and checks the extended instance of the ManagedElement IOC, 1104. In response to the received event report and in accordance with the result of said determining the Network Manager performs, 706-712, a necessary management operation.

Figure 7:
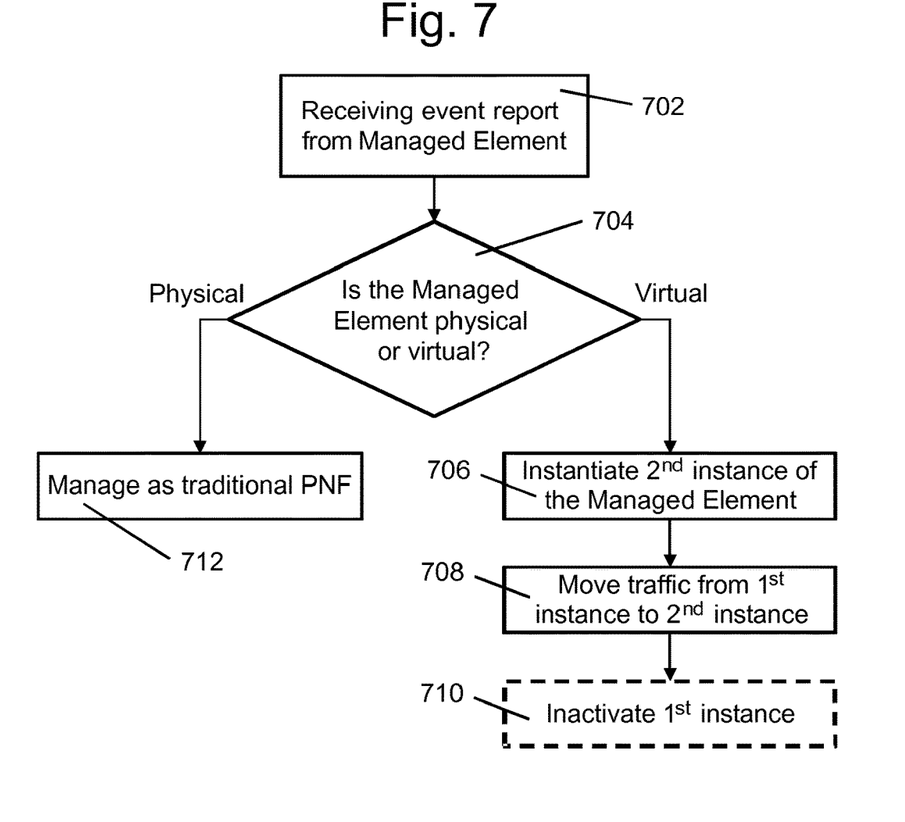

If in step 704 it is determined that the Managed Element is implemented as a first virtual network function the management operation comprises instantiating, 706 a second virtual network function as a second instance of the Managed Element and then moving, 708, traffic from said first virtual network function to said second virtual network function. After moving the traffic is completed the method, preferably, comprises inactivating, 710, said first virtual network function. The benefit of inactivating the first virtual network function is that the physical resources used for instantiating the first virtual network function are released and may be re-used for something else by the network manager, 1302.

If in step 704 it is determined that the Managed Element is implemented as a physical network function (PNF) the management operation would be one of the traditional and well known management operations performed on PNFs, for example: reboot, software upgrade, hardware upgrade.

Figure 8:
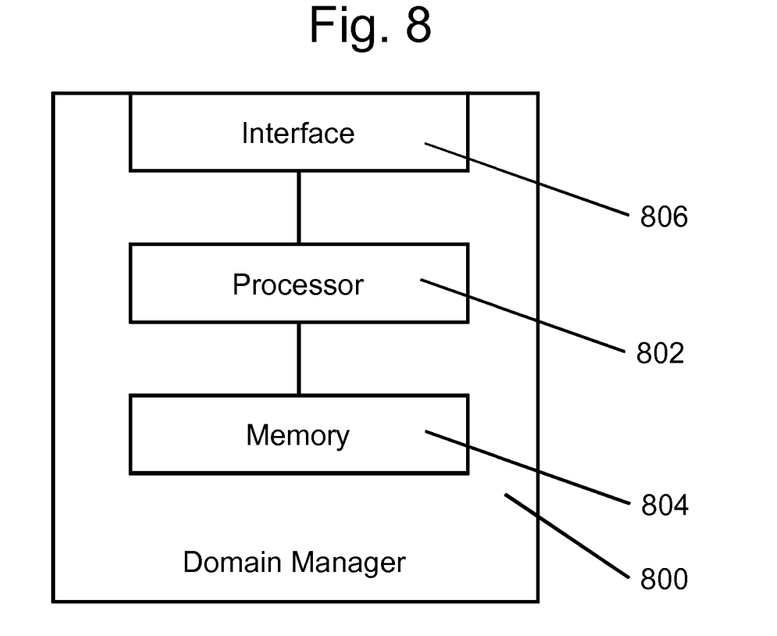
FIG. 8 is a diagram illustrating a domain manager in one embodiment of the present invention.

FIG. 8 illustrates a domain manager, 800, 1304, which implements the method for managing a wireless communications network operating at least one network slice described earlier. In a preferred embodiment, the domain manager, 800, 1304, is implemented as a physical apparatus operating in the wireless communications network.

Preferably, the domain manager, 800, 1304, comprises a processor, 802, and a memory 804, the memory, 804, contains instructions executable by the processor, 802. In the embodiment illustrated in FIG. 8 the domain manager also comprises an interface, 806, for communicating with other elements of the network. The interface, 806, processor, 802 and memory, 804, in the embodiment illustrated in FIG. 8 are connected in series, however, other architectures of the apparatus, 800, 1304, are also possible and would be envisaged by those skilled in the art. For example, the elements 802-806 could be connected to a bus.

In operation, when the instructions stored in the memory, 804, are executed by the processor, 802, the domain manager, 800, 1304, is operative to populate a first Information Object Class instance representing the logically grouped subset of network resources and/or network functions of said network slice. The domain manager, 800, 1304, is also operative to modify a generic Network Resource Model by adding the populated first Information Object Class instance into said generic Network Resource Model and then to expose the modified generic Network Resource Model.

Preferably, the domain manager, 800, 1304, is also adapted to extend a second Information Object Class instance of the generic Network Resource Model representing a Managed Element, ManagedElement IOC, 1104. To extend the ManagedElement IOC, 1104, instance the domain manager, 800, 1304, is operative to add information identifying whether said Managed Element is a physical network function or a virtual network function.

Figure 9:
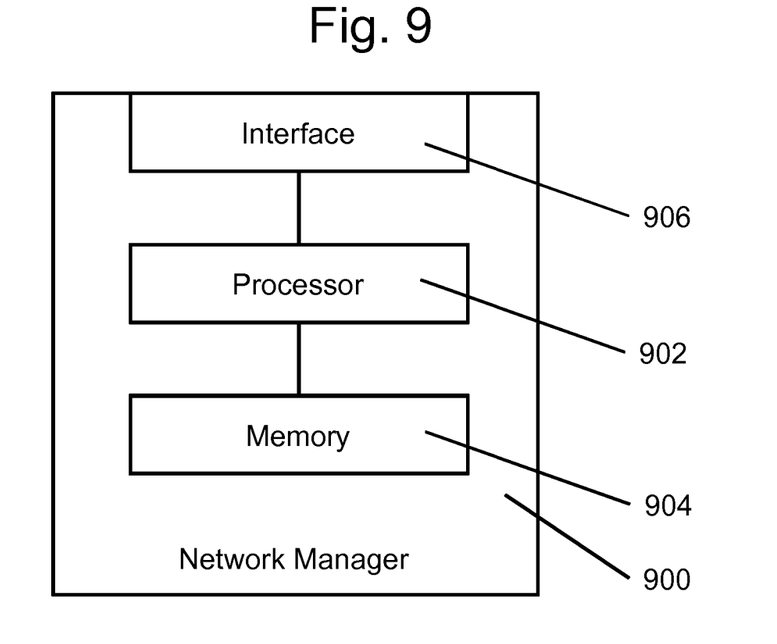
FIG. 9 is a diagram illustrating a network manager in one embodiment of the present invention.

As explained in the description of embodiments of the method in order to expose the modified generic Network Resource Model the domain manager, 800, 1304, is operative to made the modified generic Network Resource Model available via an Itf-N interface to a network manager, 900, 1302, for use in carrying out a management operation on said at least one network slice.

Depending on embodiment it may be that either the at least one network slice is created first and only then the domain manager modifies the generic NRM or it may be that the modification of the generic NRM is performed first and then in response to the modification of the NRM said at least one network slice is created.

In operation, once the generic NRM is modified (with or without extending the instance of the ManagedElement IOC, 1104) the domain manager, 800, 1304, is operative to send messages to the network manager, 900, 1302, comprising information related to operation of Managed Elements managed by the domain manager (800, 1304), using the interface defined by said modified generic Network Resource Model.

FIG. 9 illustrates a network manager, 900, 1302, which implements the method for managing a wireless communications network operating at least one network slice described earlier. In a preferred embodiment, the network manager, 900, 1302, is implemented as a physical apparatus operating in the wireless communications network.

Preferably, the network manager, 900, 1302, comprises a processor, 902, and a memory 904, the memory, 904, contains instructions executable by the processor, 902. In the embodiment illustrated in FIG. 9 the network manager also comprises an interface, 906, for communicating with other elements of the network. The interface, 906, processor, 902 and memory, 904, in the embodiment illustrated in FIG. 9 are connected in series, however, other architectures of the apparatus, 900, 1302, are also possible and would be envisaged by those skilled in the art. For example, the elements 902-906 could be connected to a bus.

In operation, when the instructions stored in the memory, 904, are executed by the processor, 902, the network manager, 900, 1302, is operative to receive from a domain manager, 800, 1304, a modified generic Network Resource Model comprising a first Information Object Class instance representing the logically grouped subset of network resources and/or network functions of said network slice. The network manager is also operative to receive from the domain manager, 800, 1304, messages comprising information related to operation of Managed Elements managed by the domain manager, 800, 1304, wherein the messages comply with an interface defined by said modified generic Network Resource Model. The network manager, 900, 1302, is also operative to carry out a management operation on said at least one network slice.

In a preferred embodiment, the received modified generic Network Resource Model comprises a second Information Object Class instance representing a Managed Element, ManagedElement IOC, 1104, comprising information identifying whether said Managed Element is a physical network function or a virtual network function.

Preferably, the modified generic Network Resource Model is received from the domain manager, 800, 1304, via an Itf-N interface.

When the network manager, 900, 1302, receives the modified generic Network Resource Model it implements changes in the network in response to these modifications. For example, the network manager, 900, 1302, may implement changes necessary to instantiate the at least one network slice.

The network manager, 900, 1302, in its preferred embodiment is operative to receive an event report from a Managed Element and determine, using the modified generic Network Resource Model, whether the Managed Element is part of a network slice. Because the messages comply with the interface defined by the modified generic NRM the information about a network slice is explicitly identified in the message. In response to the received event report and the result of said determining the network manager, 900, 1302, performs a management operation when needed.

In a preferred embodiment, when the generic NRM comprises extended instance of ManagedElement IOC, 1104, the network manager, 900, 1302, is operative to receive an event report from a Managed Element and determine, using the modified generic Network Resource Model, whether the Managed Element is a physical network function or a virtual network function. When it is known whether the Managed Element is physical or virtual the network manager is operative to perform a management operation in response to the received event report and the result of said determining.

If the Managed Element is implemented as a first virtual network function, the network manager, 900, 1302, is operative to instantiate a second virtual network function as a second instance of the Managed Element and move traffic from said first virtual network function to said second virtual network function. Preferably, the network manager is also operative to inactivate said first virtual network function after the traffic has been moved to said second virtual network function. This enables re-use of the resources freed after inactivation of said first virtual network function.

Figure 14:
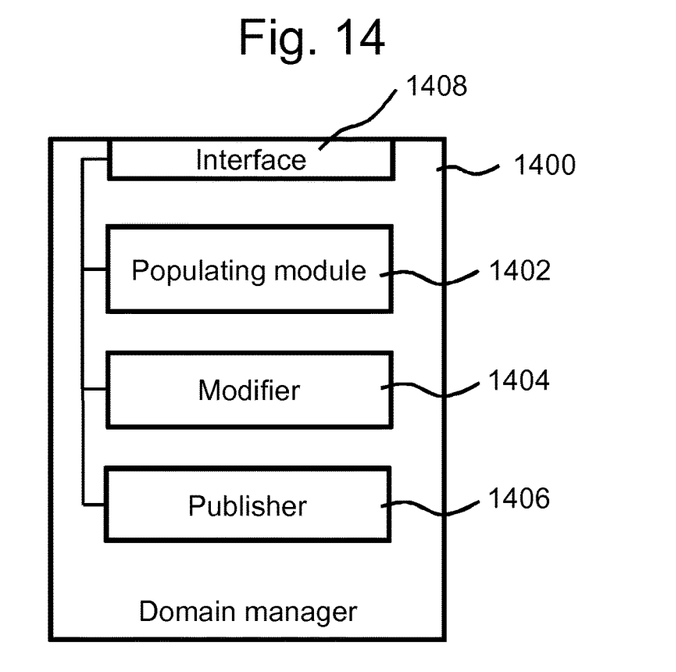
FIG. 14 is a diagram illustrating a domain manager in an alternative embodiment of the present invention.

FIG. 14 is a schematic drawing of a domain manager apparatus 1400 according to further embodiments of the disclosure. The domain manager 1400 may be configured to perform the method of FIGS. 2-4.

In one embodiment the domain manager, 1400, for managing a wireless communications network operating at least one network slice comprises a module for populating, 1402, a first Information Object Class instance, which represents logically grouped subset of network resources and/or network functions of the network slice. The domain manager also comprises a modifier, 1404, for adding the populated first Information Object Class instance to a generic Network Resource Model and a publisher, 1406, for exposing the modified generic Network Resource Model.

The apparatus, 1400, also comprises an interface, 1408, for connecting to the network and via said network to other elements of the network. Although FIG. 14 illustrates one embodiment in which the components of the domain manager 1400 are connected to a bus it would be clear for a person skilled in the art that alternative embodiments are also possible, e.g. connecting the components in series.

Figure 15:
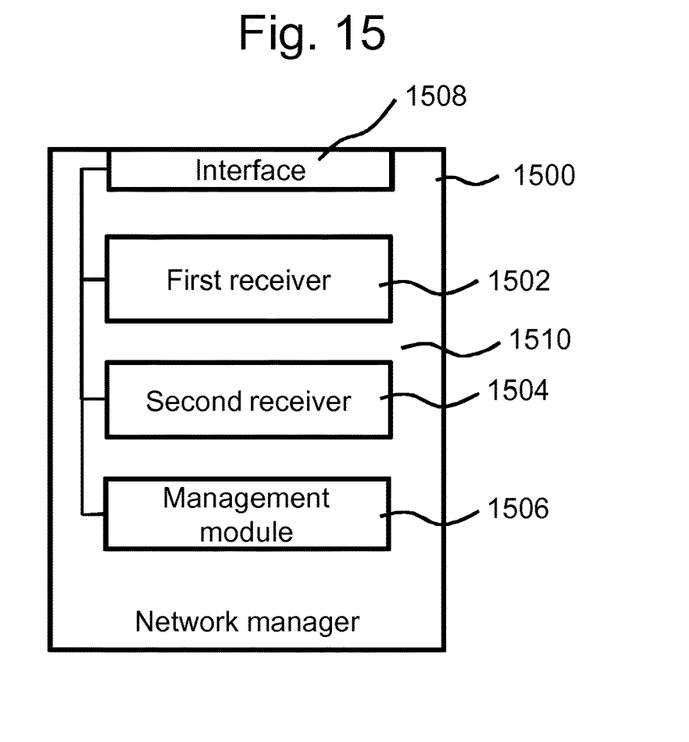
FIG. 15 is a diagram illustrating a network manager in an alternative embodiment of the present invention.

FIG. 15, on the other hand, is a schematic drawing of a network manager apparatus 1500 according to further embodiments of the disclosure. The network manager 1500 may be configured to perform the method of FIGS. 5-7.

In one embodiment the network manager, 1500, for managing a wireless communications network operating at least one network slice comprises a first receiver, 1502, for receiving from a domain manager, 1400, a modified generic Network Resource Model describing instances of Information Object Classes representing managed network resources and/or managed network functions. Said modified generic Network Resource Model comprises a first Information Object Class instance representing logically grouped subset of network resources and/or network functions of the network slice. The network manager, 1500, also comprises a second receiver, 1504, for receiving from the domain manager, 1400, messages comprising information related to operation of Managed Elements managed by the domain manager, 1400. The messages comply with an interface defined by the modified generic Network Resource Model. The network manager, 1500, further comprises a management module, 1506, for carrying out a management operation on said at least one network slice.

In an alternative embodiment the first and second receivers, 1502 and 1504, are implemented as a single receiver, 1510.

The apparatus, 1500, also comprises an interface, 1508, for connecting to the network and via said network to other elements of the network. Although FIG. 15 illustrates one embodiment in which the components of the network manager 1500 are connected to a bus it would be clear for a person skilled in the art that alternative embodiments are also possible, e.g. connecting the components in series.

Once the solution is implemented northbound systems (network managers, e.g. Network Management System/Network Slice Management Function) will be able to identify such logical networks thus simplifying optimization and prioritization activities from an enterprise customer management perspective. Another advantage is that NOC (Network Operation Center) OPEX (Operational Expenditure) costs will also be reduced as engineers will be able to leverage of this new grouping capability to prioritize daily operations. Thanks to a standardized interface, this new grouping, i.e. ManagedGroup IOC, will enable operators to offer dedicated network management capabilities to enterprise customers (subject to certain agreed constraints). Moreover, the modified Generic NRM, comprising the extended information in the ManagedElement IOC, will enable Network Management System/Network Slice Management Function, in shared subnetwork management scenarios, to execute management and instance lifecycle management in accordance with the 5G requirement of separation of concerns.

Additionally, integration with northbound systems over a standardized interface has lower system integration (SI) costs and gives operator more freedom in vendor selection.

The invention claimed is:

1. A method in a domain manager for managing a wireless communications network operating at least one network slice, said network slice comprising a logically grouped subset of network resources and/or network functions, the method comprising:
    populating a first Information Object Class instance representing the logically grouped subset of network resources and/or network functions of said network slice;
    adding the populated first Information Object Class instance to a generic Network Resource Model to produce a modified generic Network Resource Model;
    exposing the modified generic Network Resource Model
    receiving an event report from a Managed Element;
    determining, using the modified generic Network Resource Model, whether the Managed Element is part of a network slice; and
    performing a management operation in response to the received event report and the result of said determining.

2. The method according to claim 1 comprising implementing changes in the network in response to the modifications made to the generic Network Resource Model.

3. The method according to claim 1 comprising:
    determining, using the modified generic Network Resource Model, whether the Managed Element is a physical network function or a virtual network function;
    performing a management operation in response to the received event report and the result of said determining.

4. The method according to claim 3, wherein if the Managed Element is implemented as a first virtual network function, the management operation comprises:
    instantiating a second virtual network function as a second instance of the Managed Element;
    moving traffic from said first virtual network function to said second virtual network function.

5. The method according to claim 4 comprising inactivating said first virtual network function.

6. A network manager for managing a wireless communications network operating at least one network slice, said network slice comprising a logically grouped subset of network resources and/or network functions, the network manager comprising a processor and a memory, the memory containing instructions executable by the processor such that the network manager is operative to:
    receive from a domain manager a modified generic Network Resource Model comprising a first Information Object Class instance, said first Information Object Class instance representing the logically grouped subset of network resources and/or network functions of said network slice;
    receive from the domain manager messages comprising information related to operation of Managed Elements managed by the domain manager, said messages complying with an interface defined by said modified generic Network Resource Model;
    carry out a management operation on said at least one network slice;
    receive an event report from a Managed Element;
    determine, using the modified generic Network Resource Model, whether the Managed Element is part of a network slice; and
    perform a management operation in response to the received event report and the result of said determining.

7. The network manager according to claim 6, wherein the received modified generic Network Resource Model comprises a second Information Object Class instance representing a Managed Element, wherein the second Information Object Class instance comprises information identifying whether said Managed Element is a physical network function or a virtual network function.

8. The network manager according to claim 6, operative to:
    determine, using the modified generic Network Resource Model, whether the Managed Element is a physical network function or a virtual network function;
    perform a management operation in response to the received event report and the result of said determining.

9. The network manager according to claim 8, wherein if the Managed Element is implemented as a first virtual network function, the network manager is operative to:
    instantiate a second virtual network function as a second instance of the Managed Element;
    move traffic from said first virtual network function to said second virtual network function.

10. The network manager according to claim 9 operative to inactivate said first virtual network function after the traffic has been moved to said second virtual network function.

* * * * *